US010452538B2

(12) United States Patent
van Riel et al.

(10) Patent No.: US 10,452,538 B2
(45) Date of Patent: Oct. 22, 2019

(54) DETERMINING TASK SCORES REFLECTIVE OF MEMORY ACCESS STATISTICS IN NUMA SYSTEMS

(71) Applicant: Red Hat, Inc., Raleigh, NC (US)

(72) Inventors: Henri Han van Riel, Merrimack, NH (US); Vivek Goyal, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/602,109

(22) Filed: Jan. 21, 2015

(65) Prior Publication Data

US 2016/0210049 A1 Jul. 21, 2016

(51) Int. Cl.
*G06F 12/02* (2006.01)
*G06F 9/48* (2006.01)
*G06F 11/34* (2006.01)
*G06F 12/0813* (2016.01)

(52) U.S. Cl.
CPC .......... *G06F 12/0284* (2013.01); *G06F 9/48* (2013.01); *G06F 11/34* (2013.01); *G06F 12/0813* (2013.01); *G06F 2212/1024* (2013.01); *G06F 2212/2542* (2013.01); *G06F 2212/502* (2013.01)

(58) Field of Classification Search
CPC .............................................. G06F 2212/1016
See application file for complete search history.

(56) References Cited

U.S. PATENT DOCUMENTS

| 6,289,424 | B1* | 9/2001 | Stevens | G06F 9/5016 |
| | | | | 711/147 |
| 6,993,762 | B1 | 1/2006 | Pierre | |
| 7,577,770 | B2 | 8/2009 | Tanaka et al. | |
| 8,370,842 | B2 | 2/2013 | Bellows et al. | |
| 8,516,461 | B2 | 8/2013 | Bellows et al. | |
| 8,572,622 | B2 | 10/2013 | Alexander et al. | |
| 8,701,115 | B2 | 4/2014 | Bhandari et al. | |
| 2003/0009634 | A1* | 1/2003 | Arimilli | G06F 12/0817 |
| | | | | 711/141 |
| 2011/0296406 | A1* | 12/2011 | Bhandari | G06F 9/5044 |
| | | | | 718/1 |
| 2014/0143781 | A1* | 5/2014 | Yao | G06F 9/4856 |
| | | | | 718/100 |

(Continued)

OTHER PUBLICATIONS

Ananya Muddukrishna et al., "Locality-Aware Task Scheduling and Data Distribution on NUMA Systems," OpenMP in the Era of Low Power Devices and Accelerators, 2013, pp. 156-170, vol. 8122, Springer Berlin Heidelberg, Germany.

(Continued)

*Primary Examiner* — Ann J Lo
*Assistant Examiner* — Michelle L Taeuber
(74) *Attorney, Agent, or Firm* — Lowenstein Sandler LLP

(57) ABSTRACT

Disclosed are systems and methods for determining task scores reflective of memory access statistics in NUMA systems. An example method may comprise: determining, by a processing device, a first memory access score of a task with respect to a first node of a Non-Uniform Memory Access (NUMA) system; adjusting the first memory access score using memory access scores of the task with respect to one or more nodes of the NUMA system; and migrating, in view of the adjusting, at least one of: the task or a memory page associated with the task.

20 Claims, 7 Drawing Sheets

(56) References Cited

U.S. PATENT DOCUMENTS

| | | | |
|---|---|---|---|
| 2014/0359636 A1* | 12/2014 | Xu | G06F 9/4856 |
| | | | 718/108 |
| 2015/0052287 A1* | 2/2015 | Venkatasubramanian | ............ |
| | | | G06F 9/5033 |
| | | | 711/6 |
| 2015/0058400 A1* | 2/2015 | Parikh | H04L 67/1002 |
| | | | 709/203 |
| 2016/0085571 A1* | 3/2016 | Kim | G06F 9/45558 |
| | | | 718/1 |

OTHER PUBLICATIONS

Lingjia Tang et al., "Optimizing Google's Warehouse Scale Computers: The NUMA Experience," 2013, 10 pages, Internet: <https://ftp.cs.rochester.edu/~xiao/hpca13/hpca_2013.pdf>.

R. Iyer et al., "Switch Cache: A Framework for Improving the Remote Memory Access Latency of CC-NUMA Multiprocessors," High-Performance Computer Architecture, Jan. 1999, [retrieved Oct. 31, 2014], 2 pages, Internet: <http://ieeexplore.ieee.org/xpl/login.jsp?tp=&arnumber=744357&url=http%3A%2F%2Fieeexplore.ieee.org%2Fxpls%2Fabs_all.jsp%3Farnumber%3D744357>.

John Beckett, "NUMA Best Practices for Dell PowerEdge 12th Generation Servers," Dell Enterprise Solutions Group, Dec. 2012, 35 pages, Internet: <http://en.community.dell.com/cfs-file.ashx/_key/telligent-evolution-components-attachments/13-4491-00-00-20-26-69-46/NUMA-for-Dell-PowerEdge-12G-Servers.pdf>.

Henri Han Van Riel, "[patch rfc 0/5] sched, numa: Task Placement with Complex NUMA Topologies," LKML, Oct. 8, 2014, [retrieved Jan. 21, 2015], 1 page, Internet: <https://lkml.org/lkml/2014/10/8/526>.

Henri Han Van Riel, "[PATCH RFC 1/5] sched, numa: Build Table of Node Hop Distance," LKML, Oct. 8, 2014, [retrieved Jan. 21, 2015], 2 pages, Internet: <https://lkml.org/lkml/2014/10/8/527>.

Henri Han Van Riel, "[PATCH RFC 2/5] sched, numa: Classify the NUMA Topology of a System," LKML, Oct. 8, 2014, [retrieved Jan. 21, 2015], 2 pages, Internet: <https://lkml.org/lkml/2014/10/8/528>.

Henri Han Van Riel, "[PATCH RFC 3/5] sched, numa: Preparations for Complex Topology Placement," LKML, Oct. 8, 2014, [retrieved Jan. 21, 2015], 3 pages, Internet: <https://lkml.org/lkml/2014/10/8/531>.

Henri Han Van Riel, "[PATCH RFC 4/5] sched, numa: Calculate Node Scores in Complex NUMA Topologies," LKML, Oct. 8, 2014, [retrieved Jan. 21, 2015], 2 pages, Internet: <https://lkmkl.org/lkml/2014/10/8/529>.

Henri Han Van Riel, "[PATCH RFC 5/5] sched, numa: Find the Preferred NID with Complex NUMA Topology," LKML, Oct. 8, 2014, [retrieved Jan. 21, 2015], 2 pages, Internet: <https://lkml.org/lkml/2014/10/8/530>.

\* cited by examiner

| SRAT 500 | 562 Resource |
|---|---|
| 561 Proximity Domain | |
| 0 | Processor 0 |
| 0 | Memory 0 |
| 1 | Processor 1 |
| 1 | Memory 1 |
| 2 | Processor 2 |

FIG. 5

DETERMINING TASK SCORES REFLECTIVE OF MEMORY ACCESS STATISTICS IN NUMA SYSTEMS

TECHNICAL FIELD

The present disclosure is generally related to non-uniform memory access (NUMA) systems and is more specifically related to determining task scores reflective of memory access statistics in NUMA systems.

BACKGROUND

In a multi-processor computer system, a processor may access various memory devices in a number of ways ranging from local memory access via a common bus to foreign memory access via other devices, including other processors. For example, in a symmetric multi-processing (SMP) architecture, processors may directly access all memory devices. Interleaving memory pages across nodes approximates some of the uniform memory access latency characteristics of a traditional SMP system. However, as the number of processors in a computer system increases, providing an adequate bandwidth for symmetric interconnections between processors and memory devices becomes more and more difficult.

In a non-uniform memory access (NUMA) system, requirements to the bandwidth between processors and memory devices are typically alleviated by connecting each processor directly to some memory devices, while providing the processor with indirect connections (e.g., via other processors) to some other memory devices. Regions of memory connected indirectly in a NUMA system may take longer to access than directly connected regions.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 5 schematically depicts one example of a Static Resource Affinity Table (SRAT) structure;

DETAILED DESCRIPTION

Figure 1:
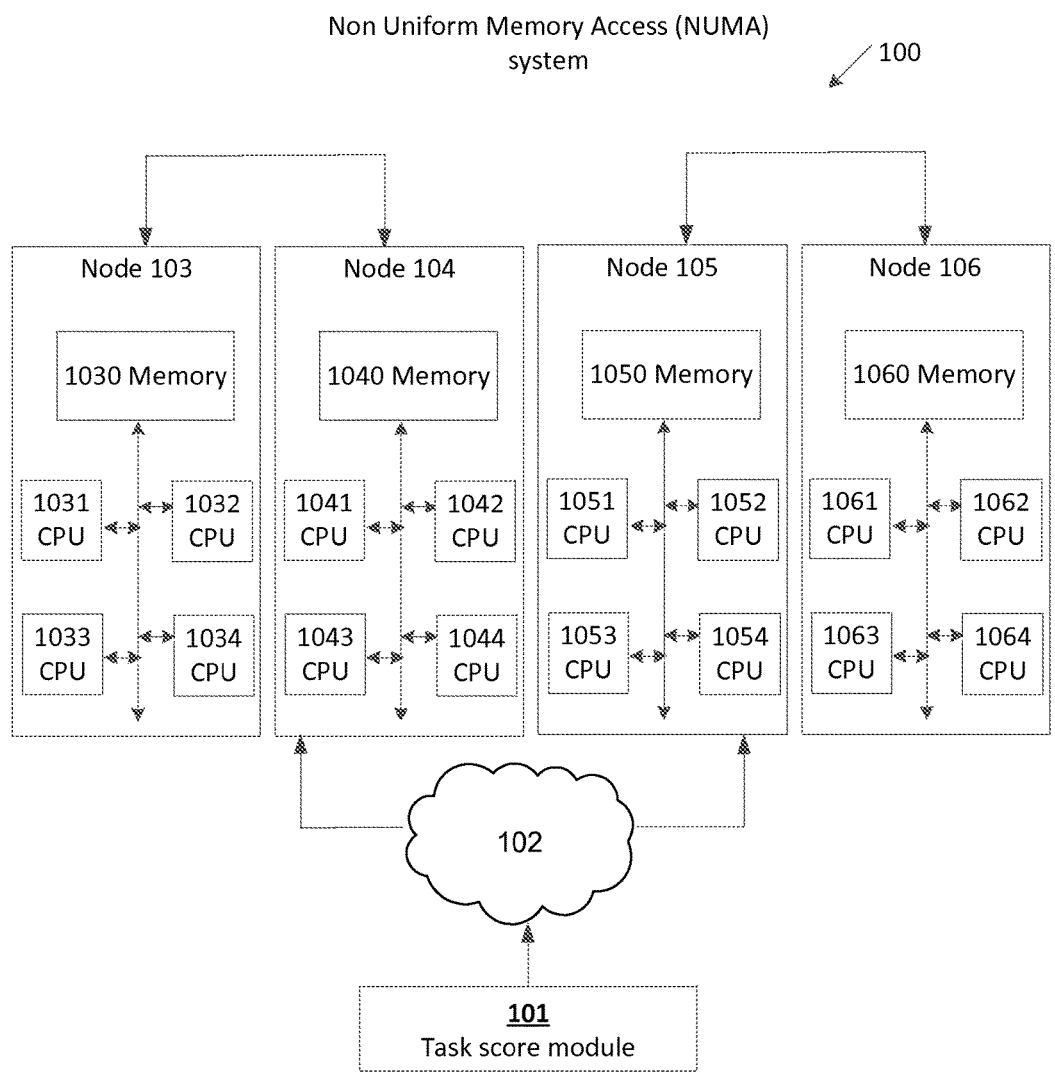
FIG. 1 depicts a system in which implementations of the present disclosure may operate in accordance with one or more aspects of the present disclosure.

Described herein are methods and/or systems for determining task scores reflective of memory access statistics in NUMA systems. The scores may then be employed for determining target nodes for task or memory pages associated with the task migration.

NUMA is a computer memory architectural model used in multiprocessor systems, where the memory access time depends on the memory location relative to the processor. Each grouping of processors and their associated connected memory is known as a NUMA node. A set of central processing unit (CPU) cores and their associated local memory are referred to as a NUMA "node."

"Task" herein shall refer to an application, a group of related applications, a group of two or more threads of a process, or two or more related processes executed by one or more CPUs. A task may run on one or more NUMA nodes. For example, the number of NUMA nodes to run a task can be less than or equal to the number of threads in the task.

Memory access time can depend upon types of inter-node connections of NUMA nodes. Local memory access involves communication from a CPU to the local memory located on a node. Foreign memory access involves communication from a CPU to non-local memory located on a different node. Moving the task to another NUMA node may improve the overall memory access efficiency of the task. For example, memory access efficiency may be improved by grouping the memory accessed by the task on the nodes that are within a certain distance of a node hosting the CPU that executes the task.

A target node, as used herein, may refer to a node selected as the destination for migration of the task or memory pages associated with the task. In one example, the task's memory access efficiency may improve by moving the task or memory pages associated with the task to a single node so that memory accesses by the task are local. In another example, for a task accessing memory residing on two or more nodes, the task and/or one or more memory pages associated with the task may migrate in view of the memory access time of the task with respect to several NUMA nodes. Memory access efficiency may be improved by moving the task or memory pages associated with the task to nodes located near each other to improve communication between the CPU and/or memory of the task. Task migration may move the task to a target node, such as the node where the memory being accessed by the task resides or a node located nearby. Memory pages associated with the task can also migrate to a target node, such as the node with the executing CPU or a node located nearby.

Nodes may be evaluated as candidate target nodes for a task by comparing the memory access times for candidate target nodes. In one implementation, candidate target nodes may be evaluated by memory access scores. A memory access score of a task with respect to a certain node may reflect a ratio of a memory access statistic measured at a local node to the memory access statistic measured at a plurality of foreign nodes of the NUMA system.

In accordance with one or more aspects of the present disclosure, memory access scores of a task may be adjusted to take into account the scores of the task with respect to one or more neighboring nodes. In an illustrative example, adjusting the memory access score uses memory access scores of the task with respect to one or more nodes of the NUMA system that are neighboring the node.

The adjusted memory access scores of the task with respect to candidate target nodes may be used to determine a migration destination for the task or for one or more memory pages associated with the task. In an illustrative example, the migration destination is the target node associated with an optimal memory access score of the task. In another illustrative example, one or more memory access pages associated with the task are migrated to a target node with the optimal adjusted score of the task with respect to the node.

Memory access latency may herein refer to a value reflective of memory access time between two NUMA nodes. Memory access latency may be reflective of the distance between the two nodes measured in hops, wherein a hop may refer to an elementary portion of the path between the two nodes. Nodes connected with a direct inter-node connection (e.g., 1 hop) may perform foreign memory access with improved memory access time compared to nodes connected via an intermediary node. A path between remotely connected nodes may include an intermediary NUMA node or device that the nodes communicate through by transmitting signals and/or messages. For example, an intermediary device can be a communication device (e.g., controller) that relays communication between remotely connected devices, such as a NUMA node. Inter-node connections are described with reference to FIGS. 3-6.

Further, in accordance with one or more aspects of the present disclosure, the memory access score adjustment may take into account NUMA system topology types. For example, in a backplane interconnect topology, the memory access score may be adjusted by adding the memory access scores of the task with respect to one or more nodes of the NUMA system located within a certain distance of the candidate target node. In a glueless mesh topology type, the memory access score may be adjusted by adding the memory access scores of the task with respect to the nodes of the NUMA system that are neighboring the node weighted by values reflective of memory access latencies between the node and a respective neighboring node.

Grouping memory access by the task across nodes may generally improve performance, scalability, and/or stability for the NUMA system. To improve the memory access efficiency of foreign memory access by the task, a task scheduler may consider grouping the memory accessed by the task on nodes to reduce the distance between a number of nodes with foreign memory access by the task. In one implementation, migration of the task to a grouping of neighboring nodes is in view of a memory access score reflective memory access statistics of task adjusted to include scores of the task with respect to one or more neighboring nodes in order to improve memory access efficiency for the task.

An example implementation of a task accessing multiple NUMA nodes and migrating in view of the task's memory access statistics is described. Actions described for a single task are capable of being performed on groups of tasks and not limited to the example implementation. Additionally, description of a single node should also be recognized as capable of being performed on groups of nodes and not limiting to the example implementation. In one implementation, the task scheduler may execute as part of and/or be invoked by an operating system kernel task scheduler.

FIG. 1 depicts an example Non-Uniform Memory Access (NUMA) system 100 operating in accordance with one or more aspects of the present disclosure. Each of node 103, node 104, node 105, and/or node 106 may include processors and memory. Processors may also be referred to as central processing units or CPU cores. In one implementation, a CPU core is an independent central processing unit within a multi-core processor. In another implementation, the CPU core may be a virtual processor that can read and/or execute program instructions. Memory may refer to the physical devices used to store computer programs or data. A memory device can refer to a volatile or non-volatile memory device, such as RAM, ROM, EEPROM, or any other device capable of storing data. In the example as shown in FIG. 1, each node can include a quantity of memory and a number of CPU cores. For instance, node 103 can include memory 1030 and CPU cores CPU 1031, CPU 1032, CPU 1033, and/or CPU 1034. CPU cores communicatively coupled to memory devices within a node may perform local memory access. For example, CPU 1031 may locally access memory 1030 on node 103 and non-locally access memory 1040 on node 104.

Nodes may be communicatively coupled via inter-node connections directly and/or indirectly. Indirectly connected nodes communicate by transmitting signals and/or messages through an intermediary device, such as a NUMA node. For example, node 103 may communicate indirectly with node 105 via intermediary node 104. Connection 102 may represent an intermediary node, intermediary communication device (e.g., controller), and/or direct connection between node 104 and node 105. NUMA nodes that directly connect do not relay communication through intermediary devices, such as node 103 directly connected to node 104. Inter-node connection layouts of the system 100 can identify topology types. Example NUMA topology types are described in detail in conjunction with FIGS. 3 and 4.

The system 100 may include a task score module 101 performed by software or hardware including, but not limited to, a computer, a wireless device, a tablet, and/or any suitable computing device. For example, task score module 101 may execute as part of a client device, server, controller, kernel, operating system, hypervisor, etc. The task score module 101 may be communicatively coupled via connection 102 to node 103, node 104, node 105, and/or node 106. In one implementation, task score module 101 may reside on, be performed by, or be part of node 103, node 104, node 105, and/or node 106. An example task score module 101 is described in detail below in conjunction with FIGS. 2-7. The task score module 101 may be implemented on various types or variations of NUMA systems such as a cache coherent non-uniform memory access (ccNUMA) or non-uniform memory access daemon (NUMAD).

Task score module 101 may determine scores of a task with respect to each node 103-106. For example, a score of a task with respect to a node may reflect a ratio of a memory access statistic (e.g., page faults) measured at a local node to the memory access statistic measured at a plurality of foreign nodes of the NUMA system. Adjusting a score of the task with respect to a node in view of the memory access scores of the task with respect to one or more neighboring nodes is described in conjunction with FIGS. 2-6.

Neighboring nodes can herein refer to nodes located within a certain distance of the node hosting the CPU that executes the task and/or accesses memory pages associated with the task. The distance between two nodes may be expressed by a number of hops or by a memory access latency between the two nodes. Neighboring nodes can be directly connected and/or communicatively coupled indirectly. Task score module 101 may adjust a score of a task with respect to a node in view of the memory access scores of the task with respect to one or more neighboring nodes. For example, task score module 101 may adjust a score of a task with respect to node 104 in view of the memory access score of the task with respect to neighboring node 105.

Figure 2:
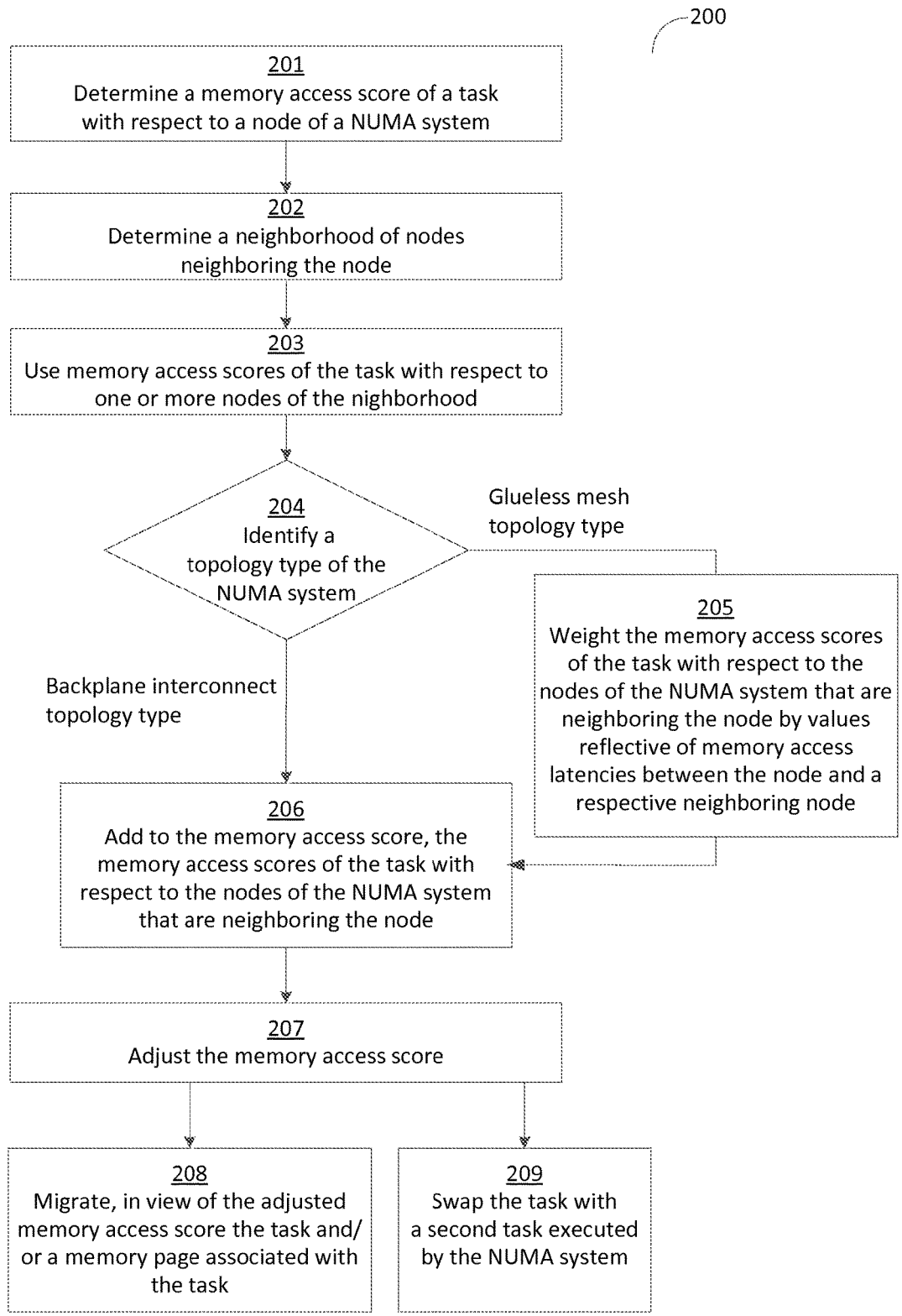
FIG. 2 is a flow diagram of an implementation for determining scores of the task reflective of memory access statistics in a NUMA system according to one implementation of the present disclosure.

FIG. 2 is a flow diagram of a method 200 for determining task scores reflective of memory access statistics in NUMA according to aspects of the implementation. Method 200 can be performed by processing logic that may include hardware (e.g., circuitry, dedicated logic, programmable logic, microcode, etc.), software (e.g., instructions running on a processing device to perform hardware simulation), or a combination thereof. The method 200 may be implemented by a software module (e.g., task score module FIG. 1 at 101). In one implementation, task score module may execute as part of or be invoked by an operating system kernel task scheduler. In one implementation, the method 200 is implemented by a computing system (e.g., a NUMA node or NUMA controller). In another implementation where the task is virtualized, a hypervisor may perform the method 200.

An optimal score of a task identifies a potential destination (e.g., one or more target nodes) for the task to migrate to that improves memory access efficiency of the task. To determine an optimal score, the processing device implementing the method may determine a score reflective of memory access statistics of the task with respect to each node. In certain implementations, the processing device may determine the score as the ratio of a memory access statistic measured at a local node to the memory access statistic measured at a plurality of foreign nodes of the NUMA system, and then in view of memory access scores of the task with respect to one or more neighboring nodes. To determine in which neighboring nodes to consider, the processing device can group or select nodes using information from system tables, inter-node connections, custom logic, etc., as described with reference to FIGS. 5 and 6. For certain topology types, the scores of the neighboring nodes may be weighted by a value reflective of the memory access latency between a node and a respective neighboring node. To adjust the score of the task with respect to a candidate target node, the processing device can add the calculated scores of the task with respect to the neighboring nodes. Then, the processing device can compare scores of the task with respect to several candidate target nodes and migrate the task in view of an optimal score of the task with respect to a selected target node. In one implementation, the migration can include swapping two or more tasks.

Starting at block 201, the processing device determines a memory access score reflective of memory access statistics of a task with respect to a candidate target node. The memory access score of the task may be determined as a ratio of a chosen memory access statistic measured at the candidate target node to the memory access statistic measured at a plurality of other nodes of the NUMA system. In one example, the memory access statistic may be provided by the total number of memory access faults. The processing device determines the score of the task with respect to the target node reflective of memory access statistics.

At block 202, the processing device determines which nodes to consider as "neighboring nodes" with respect to the candidate target node, for the purposes of adjusting the memory access score of the task. For example, neighboring nodes of a node may comprise the nodes that are directly connected to the node and/or located within a certain distance of the node. In another example, neighboring nodes are the nodes that are located within a certain number of hops from a given node. The certain distance can be determined in view of the number of hops or the memory access latency between the candidate target node and a node hosting a CPU that executes the task; then one or more nodes less than or equal to the certain distance may be considered with respect to each node.

At block 203, the processing device determines memory access scores of the task with respect to one or more nodes of the NUMA system that are neighboring the candidate target node. The memory access score of the task may reflect memory access statistics for each node in a neighborhood.

At block 204, the processing device identifies the topology type of the NUMA system. In one implementation, NUMA system having a backplane interconnect topology is described in reference to FIG. 3. In a backplane interconnect topology, nodes may connect through intermediary communication devices (e.g., controllers) incapable of running tasks. The intermediary communication device can be a hop with no memory accessible by the task that connects several nodes, where each of the nodes within a group is the same number of hops away from nodes in other groups in the NUMA system. For example, in a backplane interconnect topology, the memory access scores of the task with respect to the candidate target node in view of memory access scores of the task with respect to one or more neighboring nodes may consider neighboring nodes that do not connect through the intermediary communication device.

Figure 4:
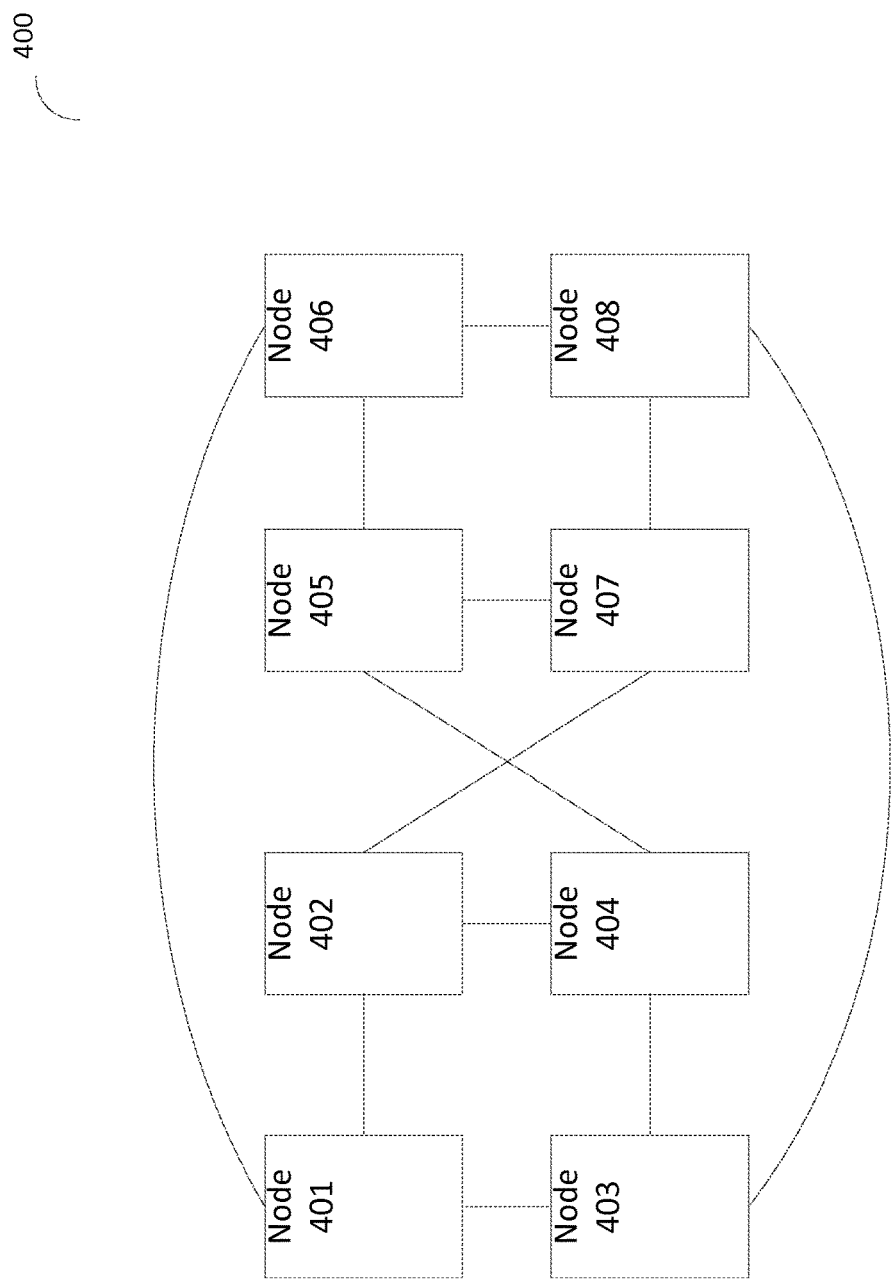
FIG. 4 depicts a block diagram of an implementation of an example system architecture representing a glueless mesh topology according to one implementation of the present disclosure.

In another implementation, the NUMA system having a glueless mesh topology is described in reference to FIG. 4. In a glueless mesh topology, nodes may connect through multiple intermediary nodes that are capable of executing tasks. For example, in a glueless mesh topology, the memory access score of the task with respect to the target node in view of memory access scores of the task with respect to one or more neighboring nodes may consider neighboring nodes that connect through the intermediary nodes. The processing device can identify the NUMA system having a glueless mesh topology by determining that for any two nodes that are distant from each other by two or more hops there is a third node that is less distant from each of the two nodes.

Identification of topology types is described herein below with reference to FIGS. 3-6. In one example, the NUMA system may determine topology with system topology information in a Static Resource Affinity Table (SRAT) and store the system topology information including memory access latency values in a System Locality Information Table (SLIT) for determining the distance nodes are from each other as described in reference to FIGS. 5 and 6.

At block 205, in response to the processing device identifying the glueless mesh topology type, the processing device weights the memory access scores of the task with respect to the nodes of the NUMA system that are neighboring the candidate target node by values reflective of memory access latencies between the candidate target node and a respective neighboring node. To determine a value reflective of the memory access latency between nodes, the processing device can access system tables as described in reference to FIGS. 5 and 6. The inter-node distance measured in hops may be derived from the memory access latency. The processing device can weight the score of the task with respect to one or more neighboring nodes by the number of hops between the candidate target node and the respective neighboring node. In certain implementations, the score of the task with respect to the target node is adjusted by a second score weighted by a value reflective of a latency between the target node and a neighboring node, where the second score is associated with the neighboring node. For example, the weighting can include the score of the task with respect to the neighboring node divided by a number of hops. Adjusting a score of the task with respect to a node in a glueless mesh topology is described in reference to FIG. 4.

At block 206, the processing device adds, to the memory access score of the task with respect to the candidate target node, the memory access scores of the task with respect to the nodes of the NUMA system that are neighboring the candidate target node. For nodes in the backplane interconnect topology, scores of the task with respect to neighboring nodes may be added. For nodes in the glueless mesh topology, the processing device can add the weighted scores of the task with respect to neighboring nodes. For example, scores of the task with respect to neighboring nodes may be weighted by a distance or memory access time difference between the node and the neighboring node.

At block 207, the processing device adjusts the memory access score using the memory access scores of the task with respect to one or more nodes of the NUMA system that are neighboring the node as described in blocks 204-206. The score of the task with respect to the target node reflective of memory access statistics can be adjusted to include the scores of the task with respect to neighboring nodes added together at block 206.

At block 208, the processing device migrates the task and/or one or more memory pages associated with the task in view of the adjusted memory access score of the task. The processing device may migrate the task to improve the overall memory access efficiency of the task. The processing device can select a destination node for the task by choosing a candidate target node having the optimal adjusted score of the task. At block 209, the processing device can swap the task with another task executed by the NUMA system, if such migration can improve the total memory access efficiency of both tasks. The node migrating task is migrating away from may be referred to as an original node. Portions of the method (e.g., blocks 201-207) may determine a score of the second task with respect to the original node of the first task as a potential destination for the second task. The processing device may also assess a penalty to the memory access efficiency of the additional task. In one implementation when there is a penalty to the memory access efficiency of the additional task, the two tasks may swap when the resulting total score of the two tasks represents improved memory access efficiency for the original task.

Figure 3:
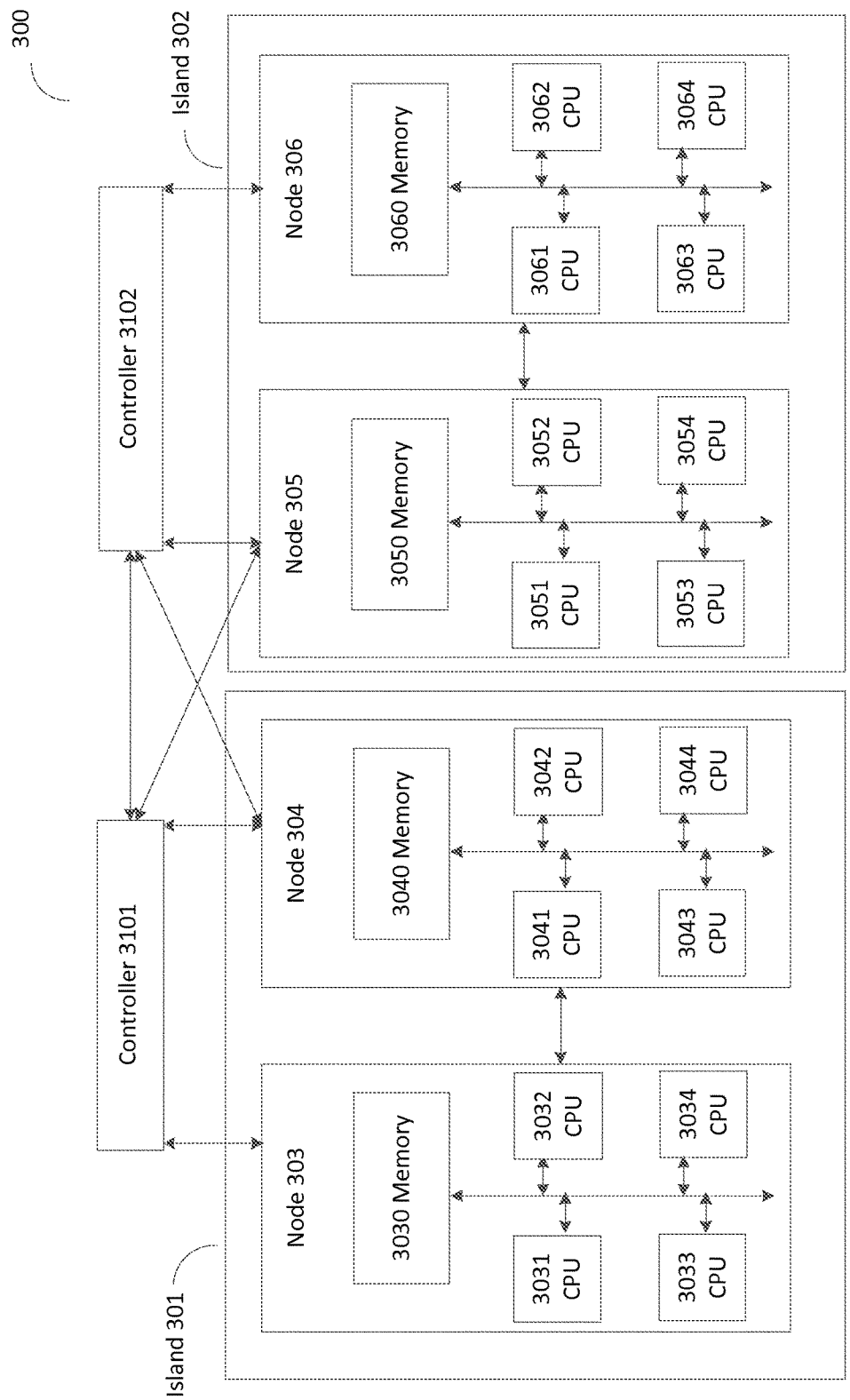
FIG. 3 depicts a block diagram of an implementation of an example system architecture representing a backplane interconnect topology according to one implementation of the present disclosure.

FIG. 3 depicts a block diagram of an implementation of an example system representing a backplane interconnect topology. A backplane interconnect topology may be a NUMA system controlled via backplane controllers (e.g., communication devices). Computer system 300 may include one or more nodes 303-306 and controllers 3101-3102 representing a backplane interconnect topology. Each node can include a quantity of memory and a number of CPU cores. For instance, node 303 can include a quantity of memory 3030 and CPU cores CPU 3031, CPU 3032, CPU 3033, and/or CPU 3034. Some architecture may be such that each node includes a quantity of memory and more than four CPU cores (e.g., each node may include more than 16 CPU cores). The system 300 may include controllers 3101-3102. The controllers may include an operating system (e.g., Linux® OS, Windows® OS, etc.) which may include a NUMA task score scheduler or method for node 303, node 304, node 305, and/or node 306. In one implementation, the controllers 3101 and/or 3102 are incapable of running tasks and may connect the nodes via another controller and/or network connection.

Nodes communicatively coupled via inter-node connections can be directly and/or indirectly connected. On NUMA systems with backplane controllers, indirectly connected nodes communicate by transmitting signals and/or messages through an intermediary communication device that relays communication between remotely connected nodes and/or other devices (e.g., controller 3101, controller 3102). Directly connected nodes (e.g., node 303 and node 304) may connect independent of a controller (e.g., controller 3101) with minimal memory access time. Intermediary communication devices may be incapable of running programs. The intermediary communication device connects groups (e.g., island 301, island 302) of nodes, where each of the nodes within a group is the same number of hops away from nodes in other groups in the NUMA system, such as island 301 and/or island 302.

A NUMA system may be identified as having a mesh topology responsive to determining that for any two nodes that are distant from each other by two or more hops there is a third node that is less distant from each of the two nodes as described in reference to FIG. 4. Distance between nodes may be determined by accessing and/or requesting information on latencies between proximity domains stored in a SLIT table as described in reference to FIGS. 5 and 6. The score of the task with respect to a node can be adjusted by adding, to the memory access score, the memory access scores of the task with respect to the nodes of the NUMA system that are neighboring the node within a certain distance. The memory access scores of the task with respect to the target node in view of memory access scores of the task with respect to one or more neighboring nodes may consider neighboring nodes that do not connect through the intermediary device. For example, a score of the task with respect to an island 301 (e.g., nodes 303 and 304) may be compared to the score of the task with respect to another island 302 (e.g., nodes 305 and 306). In one implementation, the score of the task with respect to a node can be adjusted by adding the score of the task with respect to a neighboring node multiplied by the distance between the nodes (e.g., number of hops).

FIG. 4 depicts a block diagram of an example network architecture representing a glueless mesh topology according to one aspect of the implementation of the present disclosure. A glueless system may be a mesh topology NUMA system that distributes control to each node. Computer system 400 may include one or more nodes 401-408 representing a glueless mesh topology. Each node can include a quantity of memory and a number of CPU cores. Some architecture may be such that each node includes a quantity of memory and more than four CPU cores (e.g., each node may include more than 16 CPU cores). In one implementation, each node may connect through multiple intermediary nodes that are capable of executing tasks.

Nodes communicatively coupled via inter-node connections can be directly and/or indirectly connected. On NUMA systems with glueless mesh topology, indirectly connected nodes communicate by transmitting signals and/or messages through an intermediary NUMA node that relays communication between remotely connected nodes. Directly connected nodes (e.g., node 401 and node 402) may connect independent of an intermediary node with minimal memory access time. Indirectly connected nodes (e.g., node 401 and node 404) may communicate through paths of intermediary nodes (e.g., node 402 or node 403).

NUMA system having a glueless mesh topology may be identified by determining that for any two nodes that are distant from each other by two or more hops there is a third node that is less distant from each of the two nodes. For example, topology detection may determine a maximum distance between NUMA nodes on the NUMA system, distance N, and then pick two nodes, which are distance N apart from each other to identify an intermediary node in the system that is less than distance N away from both nodes A and B. Responsive to determining there is an intermediary node in the system that is less than distance N away from both nodes A and B, the NUMA system topology can be identified as a glueless mesh topology. Distance between nodes may be determined by accessing and/or requesting information on latencies between proximity domains stored in a SLIT table from a SRAT as described in reference to FIGS. 5 and 6.

In one implementation, migration on a system with a glueless mesh NUMA topology may not have groups of nodes determined by the hardware. For example, two nodes A and B at distance N, where N>=2, there can be intermediate nodes at a distance less than N (e.g., <N) from both nodes A and B. For example, an optimal score of the task with respect to a target node may be determined by right shifting the memory access score of the task with respect to an intermediary node by the number of hops from the node being scored (e.g., node j).

The score of the task with respect to a node can be adjusted by adding, to the memory access score, the memory access scores of the task with respect to the nodes of the NUMA system that are neighboring the node. In one implementation, the adjusting includes adding, to the memory access score, the memory access scores of the task with respect to the nodes of the NUMA system that are neighboring the node, the memory access scores weighted by values reflective of memory access latencies between the node and a respective neighboring node.

The memory access scores of the task with respect to the target node in view of memory access scores of the task with respect to one or more neighboring nodes may consider neighboring nodes located within a certain distance less than or equal to a distance between the node and a reference node of the NUMA system. In another implementation, glueless mesh topology NUMA system may determine the value reflective of an access latency by combining memory accesses scores of the task with respect to neighboring NUMA nodes, where neighboring NUMA nodes are less than a maximum distance between two nodes in the NUMA system. In one example, combining memory accesses scores of the task with respect to neighboring NUMA nodes considers nodes located a distance between the target node and a reference node of the NUMA system.

In another example, the score of the task with respect to a neighboring node is determined in view of the score of the task with respect to an intermediary node. The score of the task with respect to the target node can be adjusted by a second score weighted by a value reflective of a latency between the target node and a neighboring node, where the second score is associated with the neighboring node. For example, the weighting can include the score of the task with respect to the neighboring node divided by a number of hops. In one implementation, the score of the task with respect to a neighboring node can include the score of the task with respect to the intermediary node divided by two times a number of hops from the neighboring node to the node.

FIG. 5 depicts an example Static Resource Affinity Table (SRAT) structure 500. A NUMA system may optimize memory access efficiency of a task requiring memory access to more than one node by moving the task to node in a manner decreasing the memory access time for the task among nodes. The NUMA system may employ various methods to learn the system topology information for improving a task and/or migration of memory pages associated with the task. The system topology information may include memory access latency values for processors accessing various memory devices. In one example, a system topology detector may detect the system topology information in the SRAT and System Locality Information Table (SLIT). A SRAT may include entries associating a processor or a block of memory with an integer value identifying a proximity domain. Access latencies between proximity domains may be stored in the SLIT.

The system topology detector may determine the memory access latency values, and accordingly update one or more data structures employed to store the system topology information. In one example, the system topology manager may employ the SRAT and/or SLIT defined by Advanced Configuration and Power Interface (ACPI) Specification for storing the system topology information.

The SRAT 500 may include a plurality of entries associating a processor or a block of memory with an integer value identifying a proximity domain. "Proximity domain" herein may refer to a collection (e.g., neighborhoods) of devices and/or nodes (e.g., processors and memory devices) such that the processors belonging to the collection have the same access latency to the memory devices belonging to the collection, and that latency value is typically less that the access latency of any processor belonging to the collection accessing any memory outside of the collection. In one example, processors and memory devices belonging to a single node also belong to a single proximity domain. In yet another example, processors and memory devices belonging to a first node also belong to a first proximity domain, while processors and memory devices belonging to a second node also belong to a second proximity domain. A proximity domain identifier may also identify a NUMA node, and a SRAT entry may associate a processor or a memory device with a particular NUMA node.

The SRAT 500 may be provided by a table with two columns: a proximity domain column 561 and/or a resource column 562. The system topology detector may populate the proximity domain column 561 with proximity domain identifier values, and populate the resource column 562 with processor identifier values and/or memory block identifier values. Depending on a particular implementation, the SRAT may be stored in a memory as a vector, a two-dimensional array, and/or a more complex data structure.

In one illustrative example, the SRAT 500 may include a header that identifies a variable number of entries referred to as Static Resource Allocation Structures. Two types of structures may be used to populate the table entries: Processor Local Affinity Structures and Memory Affinity Structures. A Processor Affinity Structure may identify a specific processor by Advanced Programmable Interrupt Controller (APIC) or Streamlined Advanced Programmable Interrupt Controller (SAPIC) identifier, and associate that processor with a proximity domain. A Memory Affinity Structure may identify a memory block by its base address and length, and associate that memory block with a proximity domain. Each structure may contain other fields and adhere to a specific format prescribed by the ACPI Specification.

Figure 6:
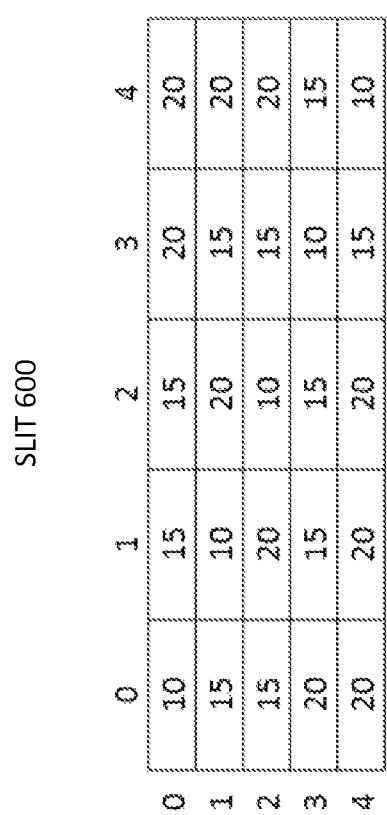
FIG. 6 schematically depicts one example of a System Locality Information Table (SLIT) structure.

FIG. 6 schematically illustrates one example of a SLIT structure 600. Access latencies between proximity domains may be stored in a SLIT 600. The SLIT may be provided by two-dimensional table 600 storing relative access latencies from one proximity domain to another. The SLIT value stored within a cell addressable by a pair of integer values (i, j) may represent the relative access latency between i-th and j-th proximity domains. Due to the fact that a SLIT 600 may be symmetrical relative to its leading diagonal, in some implementations the SLIT 600 can be stored as a full two-dimensional matrix, and in other implementations the SLIT 600 can be stored as a different data structure (e.g., a single dimensional array having its elements mapped to a triangular matrix).

In certain implementations, local memory access latency may be represented by an arbitrarily selected integer value, and hence the leading diagonal of the SLIT 600 may be filled by the system topology manager (not shown) with the same integer value indicating a processor accessing memory within the same proximity domain. In one illustrative example, the value of 10 may be used for the local access latency. In certain implementations, SLIT entries representing foreign memory access may be filled in with integer values indicating the foreign memory access latency relative to the local memory access. In one example, the foreign memory access latency which is 1.5 times longer than the local memory access latency can be represented by the value of 15 (e.g., FIG. 4, node 401 to node 402, node 403, or node 406), while the foreign memory access latency which is two times longer than the local memory access latency can be represented by the value of 20 (e.g., FIG. 4, node 401 to node 404, node 405, node 407, or node 408). For example, foreign memory may be located on a NUMA node of the system that connects via a controller (e.g., FIG. 3 at controller 3101) thereby increasing the latency. In one example, the access latency to a foreign memory via one controller may be represented by the value 17 (e.g., FIG. 3, CPU 3041 to memory 3050), and via two controllers by the value 19 (e.g., FIG. 3, CPU 3031 to memory 3060).

For implementation, the task score method (e.g., FIG. 2 at method 200) may be implemented to execute as part of or be invoked by an operating system kernel task scheduler, and the operating system may be running on a virtual machine that is executed on a host computer under a hypervisor.

NUMA nodes can be arranged in various complex layouts, groupings, interconnections, and/or topologies. For example, a direct or interconnect topology such as Hewlett Packard® DL980 or Intel® Quick Path Interconnect or a glueless mesh topology such as a Fujitsu® Primequest may realize improved memory access efficiency from task migration in view of latency in a NUMA system. The NUMA system may typically obtain information of memory access latency and/or number of hops between NUMA nodes on the system through firmware, a SLIT, and/or a SRAT.

Simple topologies may have readily identifiable groupings of nodes. Complex topologies might better associate nodes into groupings using system topology information and/or custom logic. In one implementation, a neighborhood is determined by using a certain distance (e.g., number of hops) from a target node. Then, a score of the task with respect to the target node may be adjusted to include memory access scores of the task with respect to neighboring nodes within the neighborhood.

Figure 7:
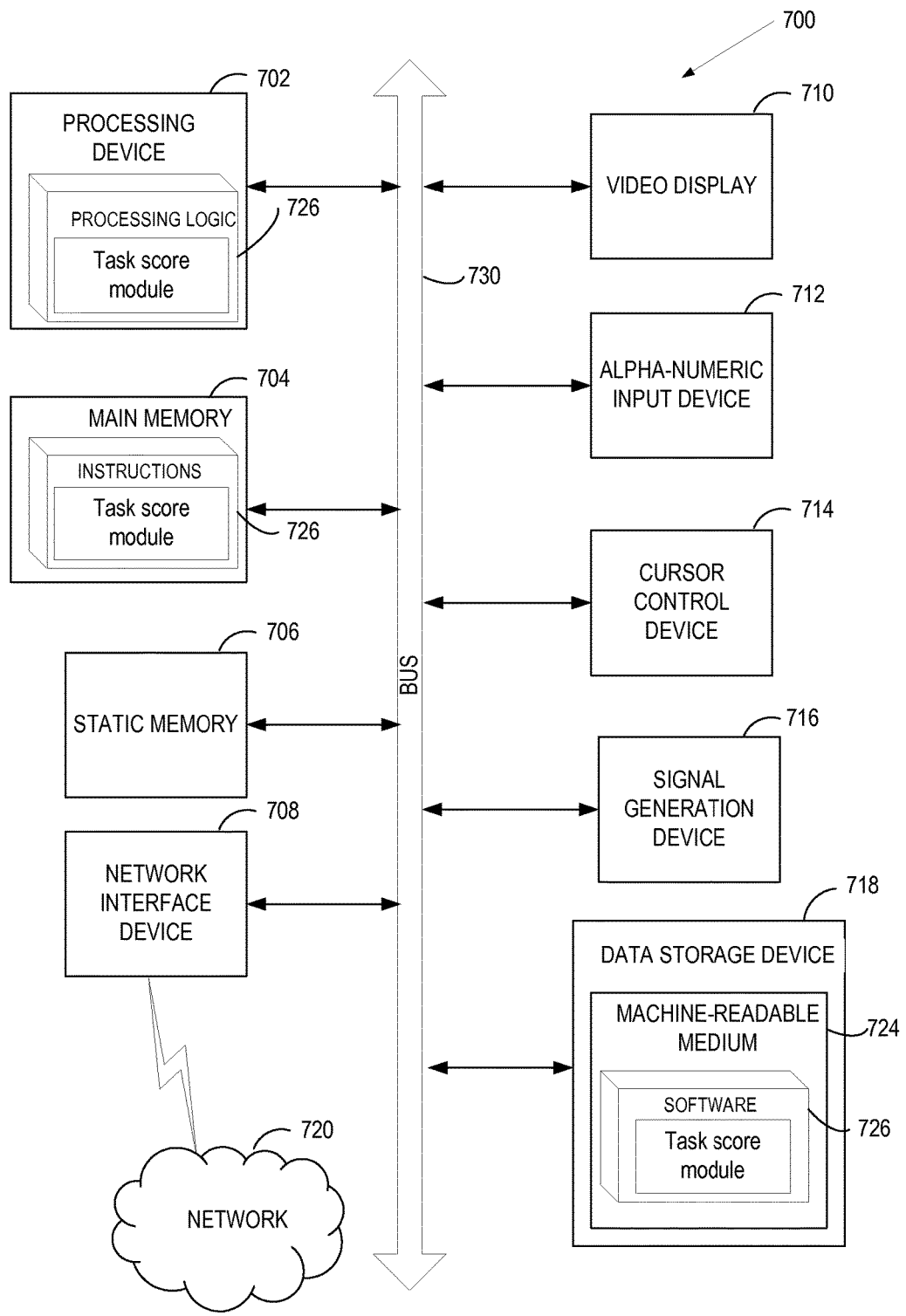
FIG. 7 depicts a high-level diagram of one implementation of a multi-processor computer system in accordance with one or more aspects of the present disclosure.

FIG. 7 depicts an example computer system 700 within which a set of instructions, for causing the computer system to perform any one or more of the methods described herein, may be executed. In certain implementations, computer system 700 may correspond to host NUMA system 100 of FIG. 1.

In certain implementations, computer system 700 may be connected (e.g., via a network, such as a Local Area Network (LAN), an intranet, an extranet, and/or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein. The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 to implement a task score module (e.g., FIG. 1 at 101 Task score module) for performing the operations and steps discussed herein.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 724 on which is stored software 726 to implement a task score module (e.g., FIG. 1 at 101 Task score module) embodying any one or more of the methodologies of functions described herein. The software 726 may also reside, completely or at least partially, within the main memory 704 as instructions 726 and/or within the processing device 702 as processing logic 726 during execution thereof by the computer system 700; the main memory 704 and the processing device 702 also constituting machine-accessible storage media.

The machine-readable storage medium 724 may also be used to store instructions 726 to implement a task score module (e.g., FIG. 1 at 101 Task score module) to implement any one or more of the methodologies of functions described herein in a computer system, such as the system described with respect to FIG. 1, and/or a software library containing methods that call the above applications.

While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

"Physical processor" or "processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

The methods, components, and features described herein may be implemented by discrete hardware components or may be integrated in the functionality of other hardware components such as Application Specific Integrated Circuits (ASICS), Field Programmable Gate Arrays (FPGAs), digital signal processor (DSPs) or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

Implementations described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium (e.g., non-transitory computer readable storage medium).

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and implementations, it will be recognized that the present disclosure is not limited to the implementations described. The scope of the disclosure should be determined with reference to the following claims, along with the full scope of equivalents to which the claims are entitled.

What is claimed is:

1. A method, comprising:
   determining, by a processing device, a first memory access score of a task with respect to a first node of a Non-Uniform Memory Access (NUMA) system, wherein the first node is a candidate target node for migration of the task or a memory page associated with the task;
   determining a topology type of the NUMA system, wherein the topology type determines a manner in which the first memory access score of the task is adjusted;
   in response to the NUMA system being a first topology type, adjusting the first memory access score by adding memory access scores of the task with respect to one or more nodes of the NUMA system neighboring the first node to the first memory access score, wherein the first topology type comprises a backplane interconnect topology, the backplane interconnect topology comprising:
      an intermediary communication device to connect the first node and a remote node of the one or more nodes of the NUMA system, wherein the intermediary communication device does not comprise memory accessible by the task, and wherein the one or more nodes of the NUMA system neighboring the first node are located in a local group with the first node;
   in response to the NUMA system being a second topology type:
      weighting the memory access scores of the task with respect to the one or more nodes of the NUMA system neighboring the first node with values reflective of memory access latencies between the first node and a respective node of the one or more nodes neighboring the first node, wherein each value of the memory access latencies reflects memory access time between the first node and the respective node, and wherein the one or more nodes neighboring the first node are nodes located within a defined number of hops from the first node; and
      adjusting the first memory access score by adding the weighted memory access scores of the task with respect to one or more nodes of the NUMA system neighboring the first node to the first memory access score; and
   migrating, in view of the adjusting, at least one of: the task or the memory page associated with the task.

2. The method of claim 1, wherein the memory access score of the task is reflective of a ratio of a memory access statistic measured at a local node to the memory access statistic measured at a plurality of foreign nodes of the NUMA system.

3. The method of claim 2, wherein the memory access statistic of the task is a number of memory access faults by the task.

4. The method of claim 1, further comprising identifying a mesh topology type of the NUMA system as the second topology type, responsive to determining that for any two nodes that are distant from each other by two or more hops there is a third node that is less distant from each of the two nodes.

5. The method of claim 1, wherein the one or more nodes are located within a certain distance of the first node.

6. The method of claim 5, wherein a distance between two nodes of the NUMA system is reflective of memory access latency between the nodes.

7. The method of claim 5, wherein the certain distance is less than a maximum distance between two nodes in the NUMA system.

8. The method of claim 5, wherein the certain distance is less than a distance between the first node and a reference node of the NUMA system.

9. The method of claim 1, wherein the migrating is performed to a node with respect to which the task has a maximum memory access score.

10. The method of claim 1, wherein the migrating comprises swapping the task with a second task being executed by the NUMA system.

11. The method of claim 1, wherein the task is represented by an application group comprising at least one of: two or more threads of a process or two or more related processes.

12. A system comprising:
a memory; and
a processing device communicatively coupled to the memory, the processing device to:
determine a first memory access score of a task with respect to a first node of a Non-Uniform Memory Access (NUMA) system, wherein the first node is a candidate target node for migration of the task or a memory page associated with the task;
determine a topology type of the NUMA system, wherein the topology type determines a manner in which the first memory access score of the task is adjusted;
in response to the NUMA system being a first topology type, adjust the first memory access score by adding memory access scores of the task with respect to one or more nodes of the NUMA system neighboring the first node to the first memory access score, wherein the first topology type comprises a backplane interconnect topology, the backplane interconnect topology comprising:
an intermediary communication device to connect the first node and a remote node of the one or more nodes of the NUMA system, wherein the intermediary communication device does not include memory accessible by the task, and wherein the one or more nodes of the NUMA system neighboring are located in a local group with the first node;
in response to the NUMA system being a second topology type:
weight the memory access scores of the task with respect to the one or more nodes of the NUMA system neighboring the first node with values reflective of memory access latencies between the first node and a respective node of the one or more nodes neighboring the first node, wherein each value of the memory access latencies reflects memory access time between the first node and the respective node, and wherein the one or more nodes neighboring the first node are nodes located within a defined number of hops form the first node; and
adjust the first memory access score by adding the weighted memory access scores of the task with respect to one or more nodes of the NUMA system neighboring the first node to the first memory access score; and
migrate, in view of the adjusting, at least one of: the task or a memory page associated with the task.

13. The system of claim 12, wherein to migrate is performed to a node with respect to which the task has a maximum memory access score.

14. A non-transitory computer readable storage medium including instructions that, when executed by a processing device, cause the processing device to:
determine a first memory access score of a task with respect to a first node of a Non-Uniform Memory Access (NUMA) system, wherein the first node is a candidate target node for migration of the task or a memory page associated with the task;
determine a topology type of the NUMA system, wherein the topology type determines a manner in which the first memory access score of the task is adjusted;
in response to the NUMA system being a first topology type, adjust the first memory access score by adding memory access scores of the task with respect to one or more nodes of the NUMA system neighboring the first node to the first memory access score, wherein the first topology type comprises a backplane interconnect topology, the backplane interconnect topology comprising:
an intermediary communication device to connect the first node and a remote node of the one or more nodes of the NUMA system, wherein the intermediary communication device does not comprise memory accessible by the task, and wherein the one or more nodes of the NUMA system neighboring are located in a local group with the first node;
in response to the NUMA system being a second topology type:
weight the memory access scores of the task with respect to the one or more nodes of the NUMA system neighboring the first node with values reflective of memory access latencies between the first node and a respective node of the one or more nodes neighboring the first node, wherein each value of the memory access latencies reflects memory access time between the first node and the respective node, and wherein the one or more nodes neighboring the first node are nodes located within a defined number of hops form the first node; and
adjust the first memory access score by adding the weighted memory access scores of the task with respect to one or more nodes of the NUMA system neighboring the first node to the first memory access score; and
migrate, in view of the adjusting, at least one of: the task or a memory page associated with the task.

15. The non-transitory computer readable storage medium of claim 14, wherein to migrate comprises to swap the task with a second task being executed by the NUMA system.

16. The system of claim 12, wherein the memory access score of the task is reflective of a ratio of a number of page faults measured at a local node to a number of page faults measured at a plurality of foreign nodes of the NUMA system.

17. The system of claim 12, wherein a distance between two nodes of the NUMA system is reflective of memory access latency between the nodes.

18. The non-transitory computer readable storage medium of claim 14, wherein the memory access score of the task is reflective of a ratio of a number of page faults measured at a local node to a number of page faults measured at a plurality of foreign nodes of the NUMA system.

19. The non-transitory computer readable storage medium of claim 14, wherein a distance between two nodes of the NUMA system is reflective of memory access latency between the nodes.

20. The non-transitory computer readable storage medium of claim 14, wherein a distance between two nodes is less than a distance between the first node and a reference node of the NUMA system.

\* \* \* \* \*